Dec. 17, 1935.   J. L. TRAVERS   2,024,786
ATTACHMENT FOR TRACTOR PLOWS
Filed July 2, 1935   2 Sheets-Sheet 1

Inventor
J. L. Travers.

By *Clarence A. O'Brien*
Attorney

Dec. 17, 1935.  J. L. TRAVERS  2,024,786
ATTACHMENT FOR TRACTOR PLOWS
Filed July 2, 1935  2 Sheets-Sheet 2
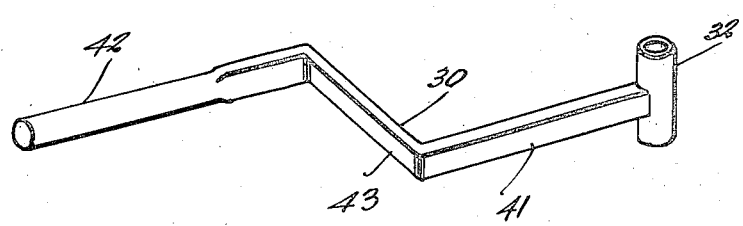
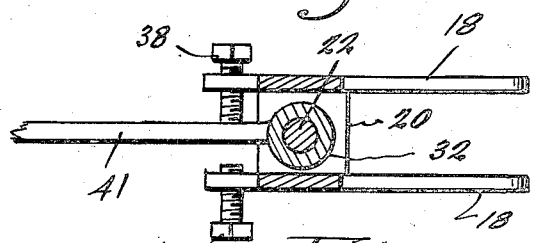
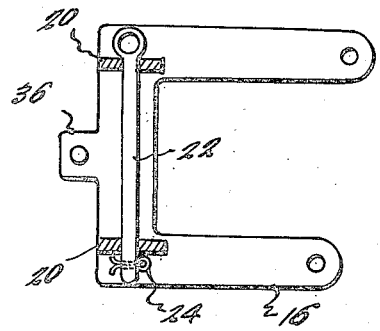
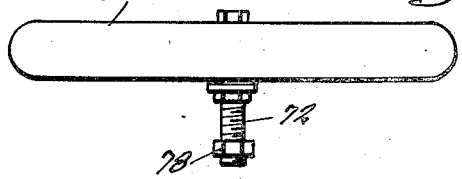
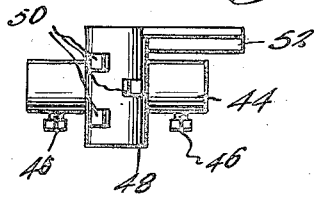
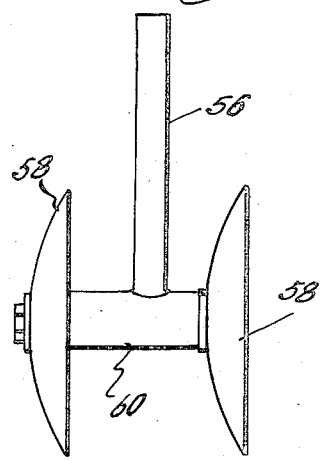
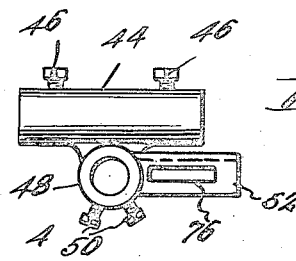
Inventor
J. L. Travers
By *Clarence A. O'Brien*
Attorney Patented Dec. 17, 1935

2,024,786

UNITED STATES PATENT OFFICE 2,024,786

ATTACHMENT FOR TRACTOR PLOWS

Joseph L. Travers, Watsonville, Calif.

Application July 2, 1935, Serial No. 29,557

2 Claims. (Cl. 97—105)

The present invention relates to a plow attachment, and more particularly to a plow attachment especially adapted for use in connection with tractor plows.

In plowing ground with a tractor plow wherein there is encountered trees or rows of trees, it is necessary to leave a strip of each row of trees to be subsequently plowed out by means of a single horse plow.

It is therefore, one of the objects of the present invention to provide an attachment for tractor plows which permits of the plowing of the ground adjacent the trees, upon the encountering of a tree, the plow subsequently returning back to its normal plowing position.

A still further important object of the invention is to provide an attachment of this character, which is automatic in its operation, cheap to manufacture, and easy to install.

A still further important object of the invention is to provide an attachment of this character, eliminating the necessity of subsequently plowing around the tree as hereinbefore described and performing this work without fear of causing damage to the trees.

Figure 1:
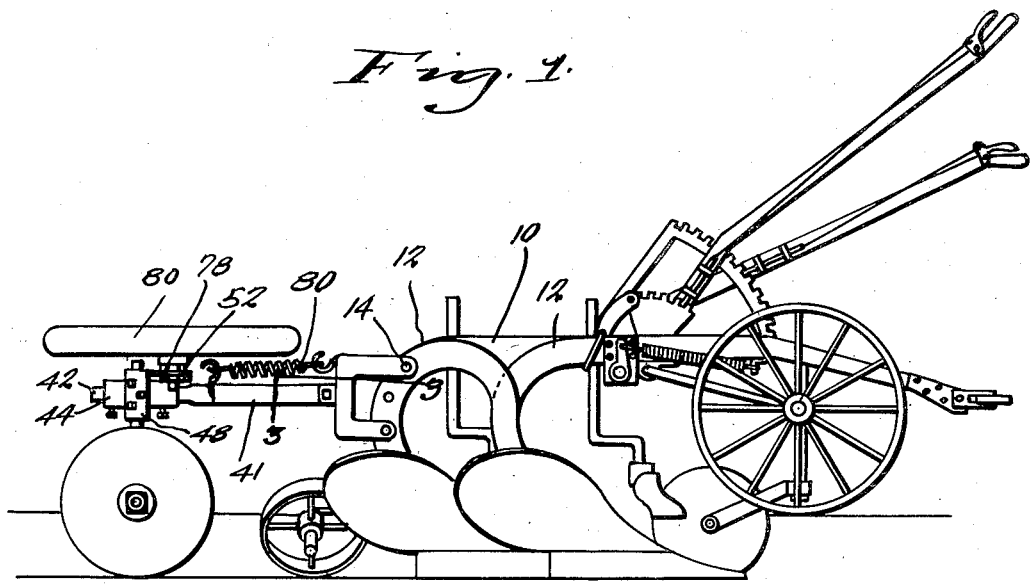
Figure 2:
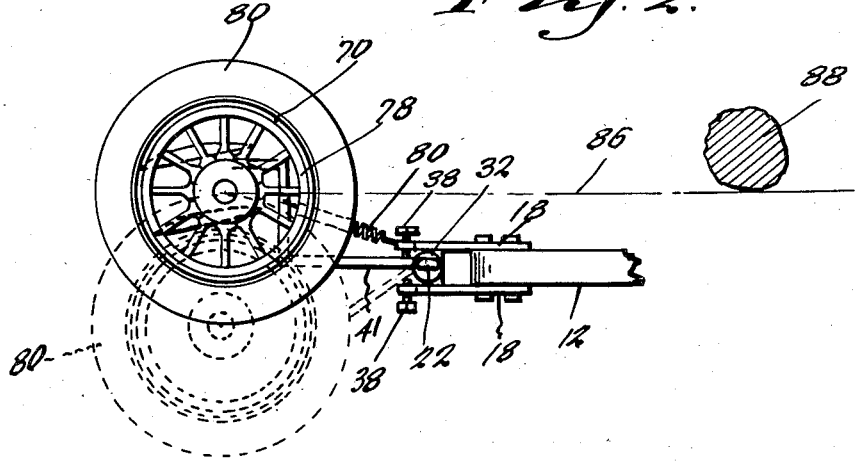

In the accompanying drawings, wherein corresponding parts are designated by similar reference numerals throughout, Figure 1 is a front elevational view of a tractor plow, showing the attachment secured thereto, Figure 2 is a fragmentary top plan view of the attachment, Figure 3 is a top plan view, partly in section of the U-shaped attaching element for attaching the plowing device to the tractor plow, Figure 4 is a front elevational view thereof partly in section, Figure 5 is a perspective view of the plow supporting arm, Figure 6 is a perspective view of the bumper and disk supporting element, Figure 7 is a top plan view thereof, and Figure 8 is a front elevational view of the disk-plow unit, and Figure 9 is a front elevational view of the circular bumper and guide.

In the accompanying drawings, wherein for the purpose of illustration, there is shown a preferred embodiment of the invention, the reference numeral 10 generally designates a tractor plow which may be of any type, and which is usually provided with the plow supporting arm 12. The subject matter of the present application relates specifically to the plow attaching device which is secured to the tractor plow 10 and for that reason it is not thought necessary to specifically describe the tractor plow, inasmuch as any type of tractor plow may be employed. To the rear plow supporting arm 12 there is secured by means of bolts 14, a U-shaped attaching clevis 16. As clearly shown in Fig. 3, this clevis comprises a pair of U-shaped members 18 separated by means of the oppositely disposed spaced integral bearings 20. Extending transversely through these bearings 20 is a pin 22 which is secured therein by means of a cotter key 24. A plow supporting arm 30 is pivotally mounted on the pin 22 by means of the tubular bearing 32. As clearly illustrated in Figure 3, the pin extends through the tubular bearing 32 and is disposed between the partition member 20.

Each of the U-shaped members 18 is provided with laterally extending apertured ears 36 having screw-threaded therein adjusting screws 38 the inner ends of which are adapted to contact the sides of the arms permitting of the relative adjustment of the arm 30 with respect to the supporting member 16. The other end of the supporting rod 30 as illustrated in Figure 5 is circular in cross-section for a portion of its length as at 42 and is receivable in the tubular portion 44 of the plow attaching element. The arm 42 is adjustable within the tubular member 44 by means of the set screws 46. Integral with the tubular member 44, is a vertically extending tubular member 48, having set screws 50 therein for adjustably positioning the same. To the upper portion of the tubular member 48 there is provided an integral laterally extending slotted arm 52.

As will be apparent, the vertical shaft 56 on which the disk plows are supported through the medium of the transversely extending arms 60 is slidable in the tubular member 48 and adjustable with respect thereto by means of the screw 50.

A circular bumper or guide 70, which is rotatably mounted on a shaft 72 receivable in the slot 76, prevents the contacting of the plow-disk 58 with the tree, and guides the same therearound. As will be apparent, this bumper may be of any type desired but in the present embodiment of the invention it includes a wheel 78 pivotally mounted on the shaft 72, which is provided with a pneumatic tire 80. The shaft 72 is adjustably secured in the slot 76 through the medium of the nut 78.

It will thus be seen that the disk plow 58 may be adjusted vertically through the medium of the tubular connection 48 and at the same time if so desired, the plow may be adjusted longitudinally with respect to the shaft 42. As shown in Figure 5, the arm 42 of the shaft is offset with respect to the arm 41 through the medium of the laterally extending right-angularly disposed arm 43.

The arm 42 is normally held in a predetermined lateral position with respect to the clevis 16 by means of the coil spring 80, one end of the spring being secured to the clevis and the other end to the right angularly extending portion 43. In operation, it will be seen, as clearly shown in Figure 2, that the plow 58 normally plows along the straight line 86. However, upon encountering the tree 88, the tire portion 80 of the rotatably mounted circular buffer or guide, contacts the tree guiding the plow 58 therearound and after completing the plowing around the tree, the coil spring 80 returns the plows to their normal straight-line plowing position.

While there is shown for the purpose of illustration a preferred embodiment of the invention, it is to be understood that it is capable of various changes and modifications without departing from the spirit and scope thereof and it is intended therefore, that only such limitations shall be imposed thereon as are indicated in the prior art or in the appended claims.

Having thus described the invention what is claimed is:

1. A plow attachment of the class described, comprising a clevis adapted to be secured to the plow, a supporting rod having one end pivotally connected to said clevis for swinging movement in a horizontal plane, the end portions of said rod being offset, an attaching member on the free end of said rod including right angularly disposed tubular members, one of said tubular members being slidable on said rod, a depending plow unit support slidable in said other tubular member, and a circular shaped resilient buffer pivotally mounted for rotation in a horizontal plane on said attaching unit.

2. A plow attachment of the character described comprising a clevis adapted to be secured to a plow, a supporting arm, said supporting arm being provided with a vertically extending barrel at one end, a pin disposed through said clevis and barrel to mount said rod for horizontal swinging, a tubular member for disposition on the other end of the rod, means for securing the said tube to the rod, a depending power unit supported adjustably by the rod, a circular shaped bumper mounted on the said tube for rotation in a horizontal frame.

JOSEPH L. TRAVERS.